US012756470B2

(12) United States Patent
Zhang et al.

(10) Patent No.: US 12,756,470 B2
(45) Date of Patent: Oct. 6, 2026

(54) HIGH-PRECISION DISTRIBUTED BROADBAND MICROWAVE PHOTONIC LOCAL OSCILLATOR SIGNAL TRANSMISSION SYSTEM BASED ON FREQUENCY TUNING

(71) Applicant: CHINA ELECTRONICS TECHNOLOGY GROUP CORPORATION NO 44 RESEARCH INSTITUTE, Chongqing (CN)

(72) Inventors: Hao Zhang, Chongqing (CN); Pengfei Qu, Chongqing (CN)

(73) Assignee: CHINA ELECTRONICS TECHNOLOGY GROUP CORPORATION NO 44 RESEARCH INSTITUTE, Chongqing (CN)

( * ) Notice: Subject to any disclaimer, the term of this patent is extended or adjusted under 35 U.S.C. 154(b) by 196 days.

(21) Appl. No.: 18/938,278

(22) Filed: Nov. 6, 2024

(65) Prior Publication Data

US 2026/0046027 A1 Feb. 12, 2026

(30) Foreign Application Priority Data

Aug. 12, 2024 (CN) ......................... 202411103001.9

(51) Int. Cl.
*H04B 10/25* (2013.01)

(52) U.S. Cl.
CPC .............................. *H04B 10/25891* (2020.05)

(58) Field of Classification Search
CPC ...... H04B 10/25891; H04B 1/38; H04B 3/02; H04B 1/02; H04B 7/02; H04B 7/14;
(Continued)

(56) References Cited

U.S. PATENT DOCUMENTS

2003/0072060 A1* 4/2003 Sourani .................. H04B 10/60 398/121
2018/0294946 A1* 10/2018 Sinclair .................. H04B 10/61
2020/0067341 A1* 2/2020 Glover .................... H02J 50/20

FOREIGN PATENT DOCUMENTS

CN 101094042 A * 12/2007
CN 101094043 A * 12/2007
(Continued)

OTHER PUBLICATIONS

W. Ng , "Photonics for microwave systems and ultra-wideband signal processing," Oct. 19, 2015, Optics Communications 373 (2016),pp. 1-12.*

(Continued)

*Primary Examiner* — Omar S Ismail

(57) ABSTRACT

A high-precision distributed broadband microwave photonic LO signal transmission system based on frequency tuning is provided, including a central station unit, a remote user unit, and a plurality of downloading user units. The plurality of the downloading user units are connected in series through a first optical fiber link to form a single-fiber bidirectional serial optical link, the first optical fiber link is a single-fiber link. A first end of the single-fiber bidirectional serial optical link is connected to the central station unit, a second end of the single-fiber bidirectional serial optical link is connected to the remote user unit. The central station unit generates a central station frequency shift optical signal according to phase/frequency fluctuation information of a first part of the first optical fiber link.

10 Claims, 3 Drawing Sheets

(58) Field of Classification Search
CPC ... H04B 7/24; H04B 5/20; H04B 5/40; H04B 10/25; H04B 10/2575; H04B 10/2589; H04B 10/43; H04B 10/501; H04B 10/516; H04B 10/58; H04B 10/801; H04B 10/806; H04B 14/002; H04B 14/02; H04B 17/10; H04B 17/30; H04B 2210/07
See application file for complete search history.

(56) References Cited

FOREIGN PATENT DOCUMENTS

| | | | | | |
|---|---|---|---|---|---|
| CN | 101359962 | A | * | 2/2009 | |
| CN | 100536371 | C | * | 9/2009 | |
| CN | 101742738 | A | * | 6/2010 | |
| CN | 103152099 | A | * | 6/2013 | |
| CN | 103267967 | A | * | 8/2013 | |
| CN | 103475416 | A | * | 12/2013 | |
| CN | 107085143 | A | * | 8/2017 | G01R 23/14 |
| CN | 107707306 | A | * | 2/2018 | H04L 7/0075 |
| CN | 108650013 | A | * | 10/2018 | H04B 7/1851 |
| CN | 108809437 | A | * | 11/2018 | H04B 10/556 |
| CN | 109186766 | A | * | 1/2019 | G01J 3/45 |
| CN | 109375200 | A | * | 2/2019 | G01S 7/021 |
| CN | 109714068 | A | * | 5/2019 | |
| CN | 111224719 | A | * | 6/2020 | H04B 10/40 |
| CN | 111610366 | A | * | 9/2020 | G01R 23/165 |
| CN | 112217566 | A | * | 1/2021 | H04B 10/2513 |
| CN | 112615679 | A | * | 4/2021 | H04B 10/6164 |
| CN | 109613335 | B | * | 5/2021 | G01R 23/02 |
| CN | 112769474 | A | * | 5/2021 | H04B 10/0795 |
| CN | 113381815 | A | * | 9/2021 | H04B 10/07951 |
| CN | 114205003 | A | * | 3/2022 | H04B 10/25 |
| CN | 113346946 | B | * | 4/2022 | H04B 10/0775 |
| CN | 113206706 | B | * | 6/2022 | H04B 10/50 |
| CN | 115225152 | A | * | 10/2022 | H04B 17/309 |
| EP | 2090927 | B1 | * | 7/2018 | G02F 1/353 |
| JP | H1127212 | A | * | 1/1999 | |
| JP | 2007060685 | A | * | 3/2007 | |
| KR | 100624989 | B1 | * | 12/2006 | H04B 10/2587 |
| KR | 20110011522 | A | * | 2/2011 | H04B 10/508 |
| WO | WO-2012155762 | A1 | * | 11/2012 | H04Q 11/0067 |

OTHER PUBLICATIONS

Xin Liu et al.,“Distributed Fiber-Optic Sensors for Vibration Detection,” Jul. 26, 2016, Sensors,2016, 16, 1164,pp. 1-24.*
Xihua Zou et al.,“Optoelectronic Oscillators (OEOs) to Sensing, Measurement, and Detection,” Dec. 31, 2015, IEEE Journal of Quantum Electronics, vol. 52, No. 1, Jan. 2016,pp. 1-12.*
Weifeng Zhang et al.,“Silicon Photonic Integrated Optoelectronic Oscillator for Frequency-Tunable Microwave Generation,” Aug. 30, 2018, Journal of Lightwave Technology, vol. 36, No. 19, Oct. 1, 2018,pp. 4655-4660.*

* cited by examiner

HIGH-PRECISION DISTRIBUTED BROADBAND MICROWAVE PHOTONIC LOCAL OSCILLATOR SIGNAL TRANSMISSION SYSTEM BASED ON FREQUENCY TUNING

TECHNICAL FIELD

The present disclosure relates to a technical field of microwave photonics, and in particular to a high-precision distributed broadband microwave photonic local oscillator (LO) signal transmission system based on frequency tuning.

BACKGROUND

High-performance microwave frequency signals are supporting technologies for radar, communication, and navigation, as well as many core equipment capabilities and are a technological frontier of major national scientific projects and infrastructure that have achieved leapfrog development. Given a current trend towards integrated coordination across sea, land, air, and space, modern large-scale fundamental scientific facilities and defense systems are continuously evolving towards networking. For example, in a distributed radar network system, coherent cooperation is achieved through unified transmission and allocation of local oscillator (LO) signals, thereby building a comprehensive, three-dimensional, and multi-layered target recognition capability. In this way, research on high-fidelity and ultra-stable transmission and allocation of the LO signals becomes extremely important.

Specifically, fiber-optic-based transmission and allocation of the LO signals is proven to be an effective means of achieving higher precision of transmission. However, the fiber-optic-based transmission and allocation of the LO signals face a challenge that a transmission delay of a fiber link changes along with changes of environmental factors such as temperature, air pressure, stress, and vibration. These changes may lead to jitter and/or drift in frequencies and phases of the LO signals received by users. Furthermore, conventional compensation methods such as compensation methods based on tunable optical or electrical delay lines have a trade-off between compensation accuracy and compensation range. This limitation makes these compensation methods unsuitable for the transmission and allocation of broadband LO signals over long distances (e.g., hundreds of kilometers) and over a wide temperature range.

SUMMARY

Aiming at defects in the prior art, the present disclosure provides a high-precision distributed broadband microwave photonic local oscillator (LO) signal transmission system based on frequency tuning.

In order to solve above technical problems, the present disclosure provide technical solutions as follows.

The high-precision distributed broadband microwave photonic LO signal transmission system based on frequency tuning is provided, including a central station unit, a remote user unit, and a plurality of downloading user units. The plurality of the downloading user units are connected in series through a first optical fiber link to form a single-fiber bidirectional serial optical link, the first optical fiber link is a single-fiber link. A first end of the single-fiber bidirectional serial optical link is connected to the central station unit, a second end of the single-fiber bidirectional serial optical link is connected to the remote user unit.

The central station unit is configured to convert an LO signal to be transmitted to an optical domain through an optical carrier to form a central station LO optical signal, extract phase/frequency fluctuation information of a first part of the first optical fiber link between the central station unit and the remote user unit according to a remote loopback composite optical signal looped back by the remote user unit, generate a central station frequency shift optical signal according to the phase/frequency fluctuation information of the first part of the first optical fiber link, combine the central station LO optical signal and the central station frequency shift optical signal into a first path to form an output composite optical signal, and output the output composite optical signal to the first optical fiber link.

The remote user unit is configured to receive the output composite optical signal through the single-fiber bidirectional serial optical link, restore the output composite optical signal to obtain a first output LO signal, perform frequency shifting on each of optical signals in the output composite optical signal, combine the optical signals in the output composite optical signal into a second path to form the remote loopback composite optical signal, and loop back the remote loopback composite optical signal to central station unit.

The plurality of the downloading user units are configured to couple the output composite optical signal and the remote loopback composite optical signal and restore the output composite optical signal and the remote loopback composite optical signal after being coupled to obtain a second output LO signal, where the output composite optical signal is transmitted forward in the first optical fiber link and the remote loopback composite optical signal is transmitted backward in the first optical fiber link.

According to the present disclosure, the central station unit generates the central station frequency shift optical signal according to the phase/frequency fluctuation information of the first part of the first optical fiber link, and the remote user unit and the plurality of downloading user units eliminate influence of phase/frequency fluctuation information of the first optical fiber link through the central station frequency shift optical signal, in this way, stable reception of microwave LO signals at the remote user unit and the plurality of the downloading user units is achieved the central station frequency shift optical signal and is independent of LO signal frequency, thereby achieving distributed broadband microwave LO signal transmission.

BRIEF DESCRIPTION OF DRAWINGS drawings described herein are used to provide a further understanding of the present disclosure and constitute a part of the present disclosure, and illustrative embodiments of the present disclosure and description thereof are used to explain the present disclosure, and do not constitute an improper limitation on the present disclosure. In the drawings.

DETAILED DESCRIPTION OF EMBODIMENTS

Embodiments of the present disclosure are described below through specific examples, and drawings provided in embodiments are merely illustrative of a basic idea of the present disclosure, and in the case of no conflict, the embodiments and features in the embodiments may be combined with each other.

Figure 1:
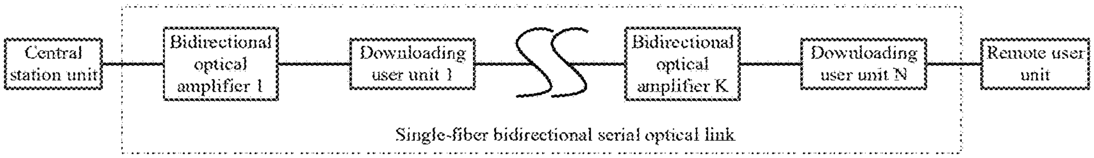
FIG. 1 illustrates a structural block diagram of a high-precision distributed broadband microwave photonic local oscillator (LO) signal transmission system based on frequency tuning according to one embodiment of the present disclosure.

Please refer to FIG. 1, FIG. 1 illustrates a structural block diagram of a high-precision distributed broadband microwave photonic local oscillator (LO) signal transmission system based on frequency tuning according to one embodiment of the present disclosure. The high-precision distributed broadband microwave photonic LO signal transmission system based on frequency tuning is provided, including a central station unit, a remote user unit, and n downloading user units, n is an integer not less than 1. The plurality of the downloading user units are connected in series through a first optical fiber link to form a single-fiber bidirectional serial optical link, the first optical fiber link is a single-fiber link. A first end of the single-fiber bidirectional serial optical link is connected to the central station unit, a second end of the single-fiber bidirectional serial optical link is connected to the remote user unit. Certainly, in one embodiment, in order to perform bidirectional power compensation on optical signals transmitted on the first optical fiber link, K bidirectional optical amplifiers are also connected in series on the single-fiber bidirectional serial optical link, where K is an integer not less than 1. Positions of the K bidirectional optical amplifiers on the single-fiber bidirectional serial link are determined according to an attenuation degree of the optical signals, and are independent of positions of the n downloading user units.

The central station unit is configured to convert an LO signal to be transmitted to an optical domain through an optical carrier to form a central station LO optical signal, extract phase/frequency fluctuation information of a first part of the first optical fiber link between the central station unit and the remote user unit according to a remote loopback composite optical signal looped back by the remote user unit, generate a central station frequency shift optical signal according to the phase/frequency fluctuation information of the first part of the first optical fiber link, so as to restore an LO signal with stable frequency by the remote user unit and the n downloading user units through the central station frequency shift optical signal. The central station unit is further configured to combine the central station LO optical signal and the central station frequency shift optical signal into a first path to form an output composite optical signal, and output the output composite optical signal to the first optical fiber link.

Figure 2:
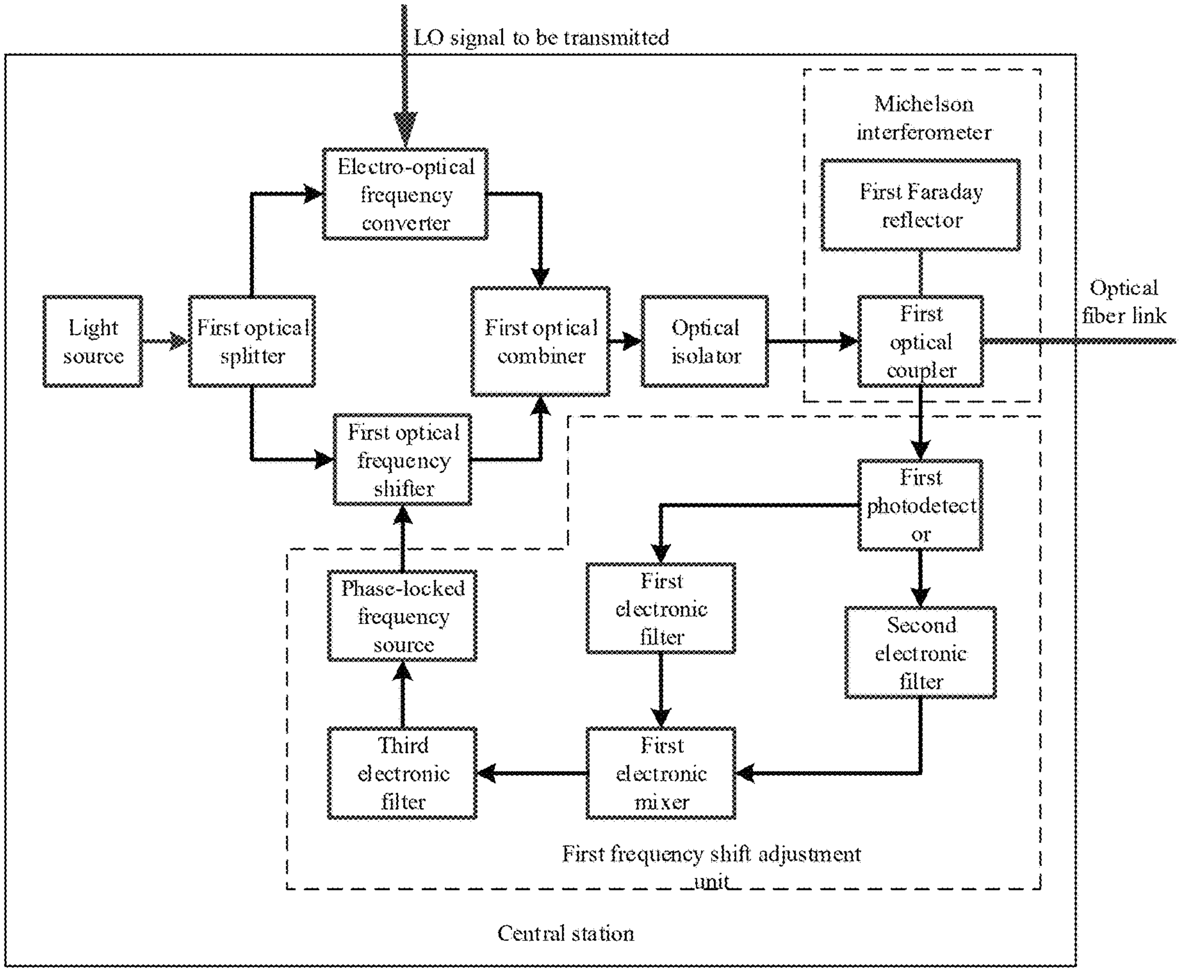
FIG. 2 illustrates a structural block diagram of a central station unit.

As shown in FIG. 2, in the embodiments, the central station unit includes a light source, a first optical splitter, and an electro-optical frequency converter, a first optical frequency shifter, a first optical combiner, an optical isolator, a Michelson interferometer, and a first frequency shift adjustment unit. The light source is configured to output the optical carrier, an output port of the light source is connected to an input port of the first optical splitter.

A first output port of the first optical splitter is connected to an optical input port of the electro-optical frequency converter, a second output port of the first optical splitter is connected to a first optical end of the first optical frequency shifter. The first optical splitter is configured to divide the optical carrier into a first optical carrier and a second optical carrier, the first optical carrier is output to the electro-optical frequency converter, and the second optical carrier is output to the first optical frequency shifter.

An electrical signal input port of the electro-optical frequency converter is configured to input the LO signal to be transmitted, an optical output port of the electro-optical frequency converter is connected to a first input port of the first optical combiner. The electro-optical frequency converter is configured to convert the LO signal to be transmitted into the optical domain through the first optical carrier output by the first optical splitter to obtain the central station LO optical signal.

An electrical signal input port of the first optical frequency shifter is connected to an output port of the first frequency shift adjustment unit, a second optical end of the first optical frequency shifter is connected to a second input port of the first optical combiner. The first optical frequency shifter is configured to perform the frequency shifting on the second optical carrier output by the first optical splitter according to a first frequency shift driving signal output by the first frequency shift adjustment unit to obtain the central station frequency shift optical signal.

An output port of the first optical splitter is connected to a first end of the Michelson interferometer through the optical isolator, the first optical combiner is configured to combine the central station LO optical signal and the central station frequency shift optical signal into the first path to obtain a central station composite optical signal, the optical isolator is configured to unidirectionally transmit the central station composite optical signal output by the first optical combiner to the Michelson interferometer and prevent an optical signal of the Michelson interferometer from transmitting back to the first optical combiner.

A second end of the Michelson interferometer is connected to an input port of the first frequency shift adjustment unit. The Michelson interferometer is configured to couple the central station composite optical signal into a first central station composite optical signal and a second central station composite optical signal, the first central station composite optical signal is output to the first optical fiber link as the output composite optical signal to form a Michelson interferometer first arm, the second central station composite optical signal serves as a local composite optical signal, the local composite optical signal serves as a reference to form a Michelson interferometer second arm, the local composite optical signal is output to the first frequency shift adjustment unit along with the remote loopback composite optical signal looped back from the first optical fiber link.

The Michelson interferometer includes a first optical coupler, a first Faraday reflector, and a second optical fiber link, the second optical fiber link is connected to the first optical coupler. A first end of the first optical coupler serves as a first end of the Michelson interferometer, a second end of the first optical coupler serves as a second end of the Michelson interferometer, a third end of the first optical coupler is connected to the single-fiber bidirectional serial optical link, and a fourth end of the first optical coupler is connected to the first Faraday reflector.

The first frequency shift adjustment unit is configured to extract the phase/frequency fluctuation information of the first part of the first optical fiber link between the central station unit and the remote user unit through the local composite optical signal and the remote loopback composite optical signal output by the Michelson interferometer to obtain the first frequency shift driving signal and output the first frequency shift driving signal.

The first frequency shift adjustment unit includes a first photodetector, a first electronic filter, a second electronic filter, a first electronic mixer, a third electronic filter, and a phase-locked frequency source. An input port of the first photodetetor serves as an input port of the first frequency shift adjustment unit and is connected to the Michelson interferometer, the first photodetector is configured to perform frequency beating on the central station LO optical signal in the local composite optical signal and a loopback LO optical signal in the remote loopback composite optical signal to generate a first phase-delayed microwave signal, perform the frequency beating on the central station frequency shift optical signal in the local composite optical signal and the loopback frequency shift optical signal in the remote loopback composite optical signal to generate a second phase-delayed microwave signal.

An output port of the first photodetector is respectively electrically connected to an input port of the first electronic filter and an input port of the second electronic filter, the first electronic filter is configured to filter to obtain the first phase-delayed microwave signal, and the second electronic filter is configured to filter to obtain the second phase-delayed microwave signal.

An output port of the first electronic filter and an output port of the second electronic filter are respectively electrically connected to two input ports of the first electronic mixer, the first electronic mixer is configured to mix the first phase-delayed microwave signal and the second phase-delayed microwave signal to generate the phase-locked reference signal;

An output port of the first electronic mixer is electrically connected to the phase-locked frequency source through the third electronic filter, an output port of the phase-locked frequency source serves as an output port of the first frequency shift adjustment unit and is electrically connected to an electrical signal input port of the first optical frequency shifter. The phase-locked frequency source is configured to generate a microwave signal with corresponding frequency as the first frequency shift driving signal corresponding to frequency of the phase-locked reference signal, and achieve phase-locked output of the first frequency shift driving signal.

The remote user unit is configured to receive the output composite optical signal through the single-fiber bidirectional serial optical link, restore the output composite optical signal to obtain a first output LO signal, perform the frequency shifting on each of optical signals in the output composite optical signal, combine the optical signals in the output composite optical signal into a second path to form the remote loopback composite optical signal, and loop back the remote loopback composite optical signal to central station unit.

Figure 3:
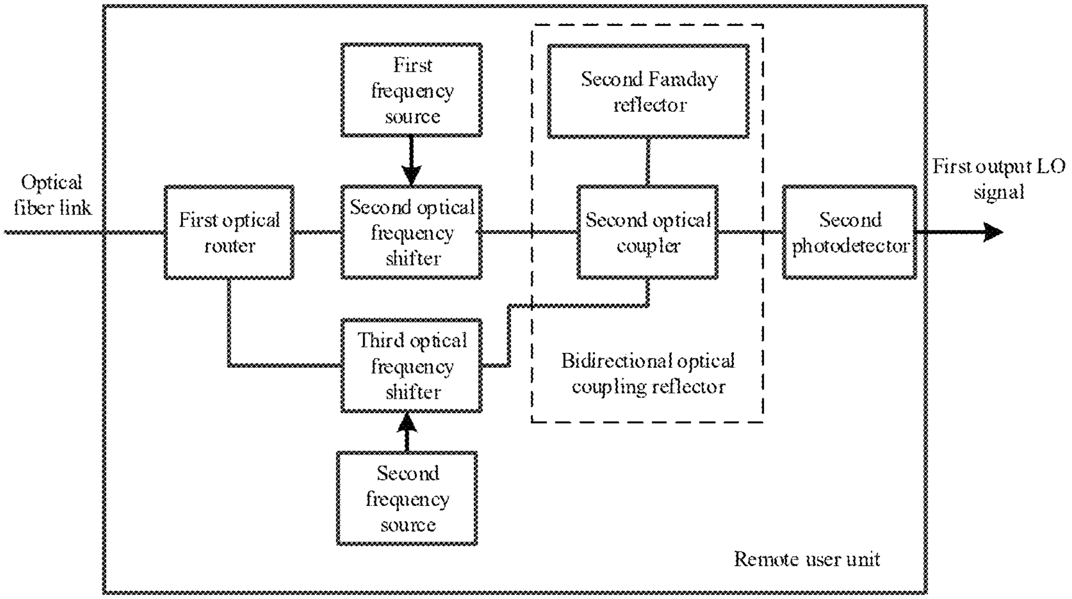
FIG. 3 illustrates a structural block diagram of a remote user unit.

Please refer to FIG. 3, in the embodiment, the remote user unit includes a first optical router, a first frequency source, a second optical frequency shifter, a second frequency source, a third optical frequency shifter, a bidirectional optical coupling reflector, and a second photodetector.

A first end of the first optical router is connected to the first optical fiber link, a second end of the first optical router is connected to a first end of the second optical frequency shifter, a third end of the first optical router is connected to a first end of the third optical frequency shifter. The first optical router is configured to receive the output composite optical signal from the first optical fiber link and extract the central station LO optical signal as a second remote LO optical signal to a first optical end of the second optical frequency shifter, extract the central station frequency shift optical signal as a second remote frequency shift optical signal to a first optical end of the third optical frequency shifter, and combine the first remote LO optical signal looped back from the second optical frequency shifter and the first remote frequency shift optical signal looped backed from the third optical frequency shifter into the second path to form the remote loopback composite optical signal, and output the remote loopback composite optical signal to the first optical fiber link.

An electrical signal input port of the second optical frequency shifter is connected to the first frequency source, a second optical end of the second optical frequency shifter is connected to a first end of the bidirectional optical coupling reflector. The first frequency source is configured to generate a first frequency signal. The second optical frequency shifter is configured to perform the frequency shifting on the second remote LO optical signal input by the first optical end thereof according to the first frequency signal to obtain a third remote LO optical signal, output the third remote LO optical signal from a second optical end thereof to the first end of the bidirectional optical coupling reflector, perform the frequency shifting on the third remote LO optical signal looped back input by the second optical end thereof to obtain the first remote LO optical signal, and output the first remote LO optical signal from the first optical end thereof to the first optical router.

An electrical signal input port of the third optical frequency shifter is connected to the second frequency source, a second optical port of the third optical frequency shifter is connected to a second end of the bidirectional optical coupling reflector. The second frequency source is configured to generate a second frequency signal. The third optical frequency shifter is configured to perform the frequency shifting on the second remote frequency shift optical signal input by the first optical end thereof according to the second frequency signal to obtain a third remote frequency shift optical signal, output the third remote frequency shift optical signal from a second optical end thereof to a second end of the bidirectional optical coupling reflector, perform the frequency shifting on the third remote frequency shift optical signal looped back from the second optical end thereof to obtain the first remote frequency shift optical signal, and output the first remote frequency shift optical signal to the first optical router.

A third end of the bidirectional optical coupling reflector is connected to an input port of the second photodetector. The bidirectional optical coupling reflector is configured to loop back third remote LO optical signal from the first end thereof to the second optical frequency shifter, loop back the third remote frequency shift optical signal from the second end thereof to the third optical frequency shifter, combine the third remote LO optical signal and the third remote frequency shift optical signal into a third path to form a remote composite optical signal, and output the remote composite optical signal to the second photodetector through a third end thereof.

The bidirectional optical coupling reflector includes a second optical coupler and a second Faraday reflector, a first end of the second optical coupler serves as the first end of the bidirectional optical coupling reflector, a second end of the second optical coupler serves as the second end of the bidirectional optical coupling reflector, a third end of the second optical coupler serves as the third end of the bidirectional optical coupling reflector, and a fourth end of the second optical coupler serves as a fourth end of the bidirectional optical coupling reflector.

The second photodetector is configured to perform the frequency beating on the third remote LO optical signal and the third remote frequency shift optical signal in the remote composite optical signal and generate the first output LO signal.

A working principle of the central station unit and the remote user unit is as follows.

The light source of the central station unit generates the optical carrier, the optical carrier is divided into the first optical carrier and the second optical carrier, the first optical carrier is output to the electro-optical frequency converter, and the second optical carrier is output to the first optical frequency shifter. The first optical carrier is configured to convert the LO signal $v_{RF}$ to be transmitted to the optical domain to form the central station LO optical signal, frequency of the central station LO optical signal is $v_{LD}+v_{RF}$. The second optical carrier is configured to perform the frequency shifting in the first optical frequency shifter through the first frequency shift driving signal for compensating frequency drift of transmitting optical signals caused by the first optical fiber link, frequency of the central station optical frequency shift optical signal generated after the frequency shifting is $v_{LD}+v_t$. Specifically, the $v_{LD}$ represents frequency of the optical carrier, the $v_{RF}$ represents frequency of the LO signal, and the $v_t$ represents frequency of the first frequency shift driving signal.

Then, two modulated optical signals including the central station LO optical signal and the central station frequency shift optical signal are combined into the central station composite optical signal and then enter the Michelson interferometer composed of the first optical coupler, the first Faraday reflector, a related optical fiber transmission link, etc. after being subjected to optical isolation processing. The central station composite optical signal is coupled into the first central station composite optical signal and the second central station composite optical signal by the Michelson interferometer, the second central station composite optical signal is reflected by the first Faraday reflector and then enters the first photodetector as the local composite optical signal, and the first central station composite optical signal services as the output composite optical signal to directly enter the first optical fiber link.

The remote user unit receives the output composite optical signal, the first optical router divides the output composite optical signal into the central station LO optical signal and the central station frequency shift optical signal, the central station LO optical signal in the output composite optical signal serves as the second remote LO optical signal, frequency of the second remote LO optical signal is $v_{LD}+v_{RF}+\dot{\Phi}_f(v_{LD}+v_{RF})$, the cental station frequency shift optical signal in the output composite optical signal as the second remote frequency shift optical signal, frequency of the second remote frequency shift optical signal is $v_{LD}+v_t+\dot{\Phi}_f(v_{LD}+v_t)$. Specifically, the $\dot{\Phi}_f(v_{LD}+v_{RF})$ represents a first frequency shifting amount caused in the first optical fiber link by transmitting the central station LO optical signal from the central station unit to the remote user unit, the $\dot{\Phi}_f(v_{LD}+v_t)$ represents a second frequency shifting amount caused in the first optical fiber link by transmitting the central station frequency shift optical signal from the central station unit to the remote user unit.

Frequency of the third remote LO optical signal generated by frequency shift caused by driving the second remote LO optical signal by the first frequency signal output by the first frequency source is $v_{LD}+v_{RF}+v_r+\dot{\Phi}_f(v_{LD}+v_{RF})$. Frequency of the third remote frequency shift optical signal generated by frequency shift caused by driving the second remote frequency shift optical signal by the second frequency signal output by the second frequency source is $v_{LD}+v_t+v_s+\dot{\Phi}_f(v_{LD}+v_t)$. Specifically, the $v_r$ represents frequency of the first frequency signal, and the $v_s$ represents frequency of the second frequency signal.

Two frequency shift optical signals including the third remote LO optical signal and the third remote frequency shift optical signal are divided into a first part and a second part in the second optical coupler, the first part of the two frequency shift optical signals respectively returns to the second optical frequency shifter and the third optical frequency shifter after being reflected by the second Faraday reflector, the second part of the two frequency shift optical signals are combined to enter the second photodetector to restore the LO signal to be transmitted, that is, the first output LO signal, for a user. Frequency $v_1$ of the first output LO signal restored by the remote user unit is $v_{RF}+v_r+\dot{\Phi}_f(v_{LD}+v_{RF})-v_t-v_s-\dot{\Phi}_f(v_{LD}+v_t)$.

Frequency of the first remote LO optical signal generated after the third remote LO optical signal is re-frequency-shifted by the second optical frequency shifter is $v_{LD}+v_{RF}+2v_r+\dot{\Phi}_f(v_{LD}+v_{RF})$. Frequency of the first remote frequency shift optical signal generated after the third remote frequency shift optical signal is re-frequency-shifted by the third optical frequency shifter is $v_{LD}+v_t+2v_s+\dot{\Phi}_f(v_{LD}+v_t)$. The first remote LO optical signal and the first remote frequency shift optical signal are combined to form the remote loopback composite optical signal, and he remote loopback composite optical signal returns back to the central station unit along a reverse optical path. In the embodiments, the central station LO optical signal and the central station frequency shift optical signal are frequency-shifted twice at the remote user unit during loopback, and therefore, $v_r$ also represents frequency shift generated by the central station LO optical signal at the remote user unit for single frequency shift processing, and $v_s$ also represents frequency shift generated by the central station frequency shift optical signal at the remote user unit for single frequency shift processing. There are two effects of frequency shift of the remote user unit, first, frequency of a forward transmitting optical signal and frequency of a backward transmitting optical signal may have a significant difference, so as to avoid nonlinear effects such as fiber scattering; second, if the second photodetector directly receives a microwave signal, there would be a frequency difference with a transmitted microwave signal, which may be compensated here.

After the central station unit receives the remote loopback composite optical signal, the remote loopback composite optical signal is partially coupled through the Michelson interferometer to enter the first photodetector. The first remote LO optical signal in the partially entering remote loopback composite optical signal serves as the loopback LO optical signal, and first remote frequency shift optical signal in the partially entering remote loopback composite optical signal serves as the loopback frequency shift optical signal. Frequency of the loopback LO optical signal is $v_{LD}+v_{RF}+2v_r+\dot{\Phi}_f(v_{LD}+v_{RF})+\dot{\Phi}_f(v_{LD}+v_{RF}+2v_r)$, frequency of the loopback frequency shift optical signal is $v_{LD}+v_t+2v_s+\dot{\Phi}_f(v_{LD}+v_t)+\dot{\Phi}_f(v_{LD}+v_t+2v_s)$. The $\dot{\Phi}_f(v_{LD}+v_{RF}+2v_r)$ represents a third frequency shifting amount caused in the first optical fiber link by looping back the first remote LO optical signal from the remote user unit to the central station unit, and the $\dot{\Phi}_f(v_{LD}+v_t+2v_s)$ represents a fourth frequency shifting amount caused in the first optical fiber link by looping back the first remote frequency shift optical signal from the remote user unit to the central station unit.

Four optical signals including the central station LO optical signal, the central station frequency shift optical signal, the loopback LO optical signal, and the loopback frequency shift optical signal are heterodyned pairwise in the first photodetector. Subsequently, one path is filtered by the first electronic filter to obtain the first phase-delayed microwave signal, while the other path is filtered by the second electronic filter to obtain the second phase-delayed microwave signal. Frequency of the first phase-delayed microwave signal is $2v_r+\dot{\Phi}_f(v_{LD}+v_{RF})+\dot{\Phi}_f(v_{LD}+v_{RF}+2v_r)$, frequency of the second phase-delayed microwave signal is $2v_s+\dot{\Phi}_f(v_{LD}+v_t)+\dot{\Phi}_f(v_{LD}+v_t+2v_s)$.

Frequency of the phase-locked reference signal obtained by further mixing the first phase-delayed microwave signal and the second phase-delayed microwave signal is $2v_r-2v_s+\dot{\Phi}_f(v_{LD}+v_{RF})+\dot{\Phi}_f(v_{LD}+v_{RF}+2v_r)-\dot{\Phi}_f(v_{LD}+v_t)-\dot{\Phi}_f(v_{LD}+v_t+2v_s)$.

The phase-locked frequency source locks a local frequency source according to the phase-locked reference signal to output the first frequency shift driving signal, $v_t$ represents frequency of the first frequency shift driving signal and is expressed as follows:

$$v_t = k\big[2v_r - 2v_s + \Phi_f(v_{LD} + v_{RF}) + \Phi_f(v_{LD} + V_{RF} + 2v_r) - \Phi_f(v_{LD} + v_t) - \Phi_f(v_{LD} + v_t + 2v_s)\big].$$

Specifically, the k is a constant. In the embodiment, the k is ½, so that the frequency of the first frequency shift driving signal is expressed as follows:

$$v_t = \frac{1}{2}\big[2v_r - 2v_s + \Phi_f(v_{LD} + v_{RF}) + \Phi_f(v_{LD} + v_{RF} + 2v_r) - \Phi_f(v_{LD} + v_t) - \Phi_f(v_{LD} + v_t + 2v_s)\big].$$

A value of the $v_t$ is substituted into the first output LO signal to obtain the frequency $v_1$ of the first output LO signal, the frequency $v_1$ of the first output LO signal is expressed as follows:

$$v_1 = v_{RF} + \frac{1}{2}\Phi_f(v_{LD} + v_{RF}) - \frac{1}{2}\Phi_f(v_{LD} + v_{RF} + 2v_r) + \frac{1}{2}\Phi_f(v_{LD} + v_t + 2v_s) - \frac{1}{2}\Phi_f(v_{LD} + v_t).$$

Since the first optical fiber link in the embodiments is the single-fiber link, the optical signal is bidirectionally transmitted in the first optical fiber link, it can be approximately considered as follows:

$$\Phi_f(v_{LD} + v_{RF}) = \Phi_f(v_{LD} + v_{RF} + 2v_r);\text{ and}$$

$$\Phi_f(v_{LD} + v_t) = \Phi_f(v_{LD} + v_t + 2v_s).$$

Therefore, the frequency $v_1$ of the first output LO signal is equal to $v_{RF}$ can be obtained. In this way, stable reception of the LO signal is achieved at the remote user unit.

The plurality of the downloading user units are configured to couple the output composite optical signal and the remote loopback composite optical signal and restore the output composite optical signal and the remote loopback composite optical signal after being coupled to obtain a second output LO signal as an LO signal restored by the plurality of the downloading user units, where the output composite optical signal is transmitted forward in the first optical fiber link and the remote loopback composite optical signal is transmitted backward in the first optical fiber link.

Figure 4:
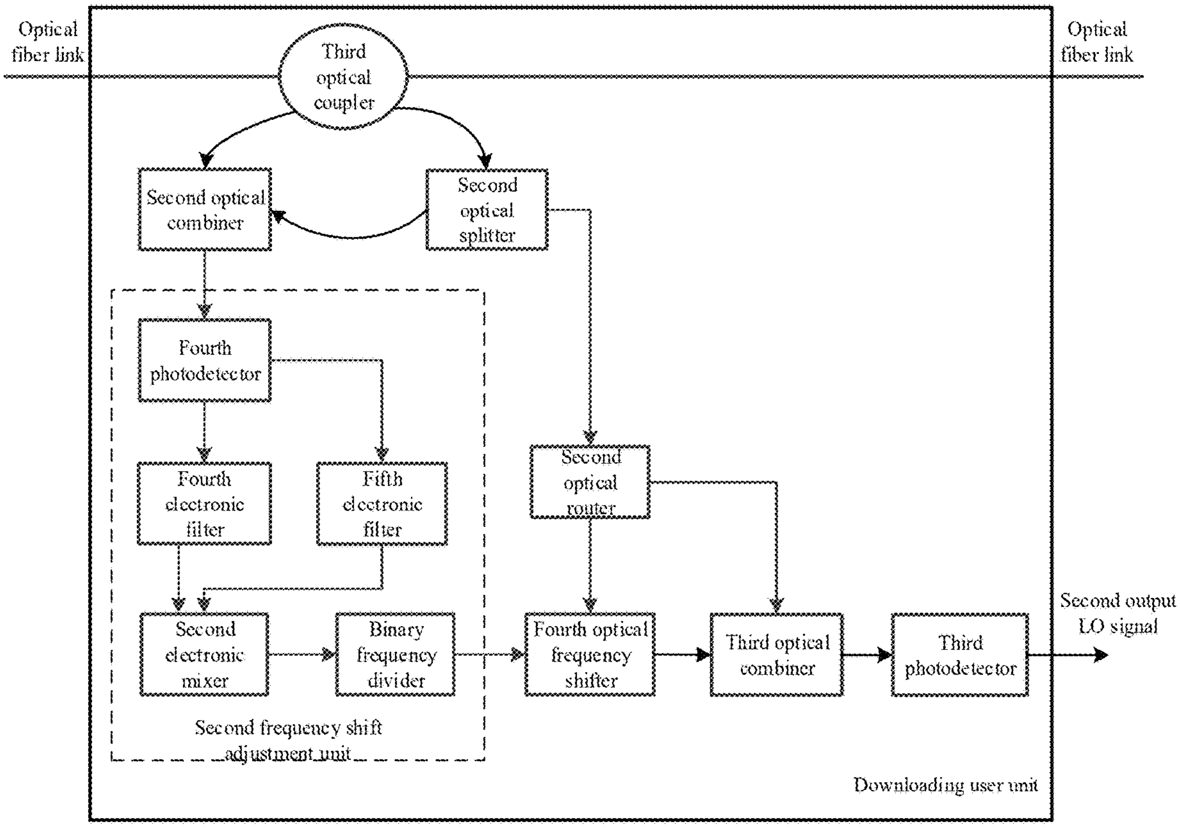
FIG. 4 illustrates a structural block diagram of a downloading user unit.

Please refer to FIG. 4, each of the plurality of the downloading user units includes a third optical coupler, a second optical splitter, a second optical combiner, a second frequency shift adjustment unit, a second optical router, a fourth optical frequency shifter, a third optical combiner, and a third photodetector. A third end of the third optical coupler and a fourth end of the third optical coupler are connected to the first optical fiber link, a first end of the third optical coupler is connected to an input port of the second optical splitter, and a second end of the third optical coupler is connected to a first input port of the second optical combiner.

The third optical coupler is configured to couple the output composite signal from the first optical fiber link as a forward transmitting composite optical signal, couple the remote loopback composite optical signal from the first optical fiber link as a backward transmitting optical signal, serve the central station LO optical signal in the output composite optical signal after being coupled as a first downloading LO optical signal of the forward transmitting composite optical signal, serve the central station frequency shift optical signal in the output composite optical signal after being coupled as a first downloading frequency shift optical signal of the forward transmitting composite optical signal, serve the first remote LO optical signal in the remote loopback composite optical signal after being coupled as a second downloading LO optical signal of the backward transmitting composite optical signal, serve the first remote frequency shift optical signal in the remote loopback composite optical signal after being coupled as a second downloading frequency shift optical signal of the backward transmitting composite optical signal, transmit the forward transmitting composite optical signal to the second optical splitter through the first end of the third optical coupler, and transmit the backward transmitting composite optical signal to the second optical combiner through the second end of the third optical coupler.

A first output port of the second optical splitter is connected to a second input port of the second optical combiner, a second output port of the second optical splitter is connected to a first end of the second optical router. The second optical splitter is configured to divide the forward transmitting composite optical signal output by the third optical coupler into a first forward transmitting composite optical signal and a second forward transmitting composite optical signal, the first forward transmitting composite optical signal is output to the second optical combiner, and the second forward transmitting composite optical signal is output to the second optical router.

An output port of the second optical combiner is connected to an input port of the second frequency shift adjustment unit. The second optical combiner is configured to combine the backward transmitting composite optical signal output by the third optical coupler and the first forward transmitting composite optical signal output by the second optical splitter into a fourth path to form a first downloading composite optical signal and output the first downloading composite optical signal to the second frequency shift adjustment.

An output port of the second frequency shift adjustment unit is connected to an electrical signal input port of the fourth optical frequency shifter, the second frequency shift adjustment unit is configured to extract phase/frequency fluctuation information of a second part of the first optical fiber link between the central station unit and a corresponding one of the plurality of the downloading user units and a third part of the first optical fiber link from the central station unit through the remote user unit back to the corresponding one of the plurality of the downloading user units to obtain a second frequency shift driving signal, and output the second frequency shift driving signal to the fourth optical frequency shifter.

A first end of the second optical router is connected to a first optical end of the fourth optical frequency shifter, a second end of the second optical router is connected to a first input port of the third optical combiner. The second optical router is configured to extract the first downloading LO optical signal from the second forward transmitting composite optical signal output by the second optical splitter, output the first downloading LO optical signal to the fourth optical frequency shifter, extract the first downloading frequency shift optical signal, and output the first downloading frequency shift optical signal to the third optical combiner.

A second optical port of the fourth optical frequency shifter is connected to a second input port of the third optical combiner. The fourth optical frequency shifter is configured to perform the frequency shifting on the first downloading LO optical signal output by the second optical router according to the second frequency shift driving signal output by the second frequency shift adjustment unit to obtain a third downloading LO optical signal and output the third downloading LO optical signal to the third optical combiner.

An output port of the third optical combiner is connected an input port of the third photodetector. The third optical combiner is configured to combine the third downloading LO optical signal output by the fourth optical frequency shifter and the first downloading frequency shift optical signal output by the second optical router into a fifth path to form a second downloading composite optical signal and output the second downloading composite optical signal to the third photodetector.

The third photodetector is configured to perform the frequency beating on the third downloading LO optical signal and the first downloading frequency shift optical signal in the second downloading composite optical signal to generate the second output LO signal.

The second frequency shift adjustment unit includes a fourth photodetector, a fourth electronic filter, a fifth electronic filter, a second electronic mixer, and a binary frequency divider. An input port of the fourth photodetector serves as an input port of the second frequency shift adjustment unit and is connected to the output port of the second optical combiner, an output port of the fourth photodetector is respectively electrically connected to an input port of the fourth electronic filter and an input port of the fifth electronic filter.

The fourth photodetector is configured to perform the frequency beating on the first downloading LO optical signal in the forward transmitting composite optical signal and the second downloading LO optical signal in the backward transmitting composite optical signal to generate a third phase-delayed microwave signal and perform the frequency beating on the first downloading frequency shift optical signal in the forward transmitting composite optical signal and the second downloading frequency shift optical signal in the backward transmitting composite optical signal to generate a fourth phase-delayed microwave signal.

An output port of the fourth electronic filter and an output port of the fifth electronic filter are respectively electrically connected to two input ports of the second electronic mixer, an output port of the second electronic mixer is electrically connected to an input port of the binary frequency divider. an output port of the binary frequency divider serves as an output port of the second frequency shift adjustment unit and is electrically connected to an electrical signal input port of the fourth optical frequency shifter.

The second electronic mixer is configured to mix the third phase-delayed microwave signal and the fourth phase-delayed microwave signal to generate a frequency shift reference signal.

The binary frequency divider is configured to divide the frequency shift reference signal by a divide-by-two frequency to obtain the second frequency shift driving signal.

A working principle of the plurality of the downloading user units is as follows.

In the forward transmitting composite optical signal, frequency of the first downloading LO optical signal is $v_{LD}+v_{RF}+\dot{\Phi}_{f1}(v_{LD}+v_{RF})$, frequency of the first downloading frequency shift optical signal is $v_{LD}+v_t+\dot{\Phi}_{f1}(v_{LD}+v_t)$.

In the backward transmitting composite optical signal, frequency of the second downloading LO optical signal is $v_{LD}+v_{RF}+2v_r+\dot{\Phi}_f(v_{LD}+v_{RF})+\dot{\Phi}_{f2}(v_{LD}+v_{RF}+2v_r)$, frequency of the second downloading frequency shift optical signal is $v_{LD}+v_t+2v_s+\dot{\Phi}_f(v_{LD}+v_t)+\dot{\Phi}_{f2}(v_{LD}+v_t+2v_s)$.

Specifically, the $\dot{\Phi}_{f1}(v_{LD}+v_{RF})$ represents a fifth frequency shifting amount caused in the first optical fiber link by transmitting the central station LO optical signal from the central station unit to the corresponding one of the plurality of the downloading user units, the $\dot{\Phi}_f(v_{LD}+v_t)$ represents a sixth frequency shifting amount caused in the first optical fiber link by transmitting the central station frequency shift optical signal from the central station unit to the corresponding one of the plurality of the downloading user units, the $\dot{\Phi}_{f2}(v_{LD}+v_{RF}+2v_r)$ represents a seventh frequency shifting amount caused in the first optical fiber link by transmitting the first remote LO optical signal from the remote user unit to the corresponding one of the plurality of the downloading user units, and the $\dot{\Phi}_{f2}(v_{LD}+v_t+2v_s)$ represents an eighth frequency shifting amount caused in the first optical fiber link by transmitting the first remote frequency shift optical signal from the remote user unit to the corresponding one of the plurality of the downloading user units.

The forward transmitting composite optical signal after being coupled is divided into the first forward transmitting composite optical signal and the second forward transmitting composite optical signal, the first forward transmitting composite optical signal and the backward transmitting composite optical signal after being coupled enter the fourth photodetector. The four optical signals are heterodyned pairwise to form two microwave signals including the third phase-delayed microwave signal and the fourth phase-delayed microwave signal. Specifically, frequency of the third phase-delayed microwave signal is $2v_r+\dot{\Phi}_f(v_{LD}+v_{RF})+\dot{\Phi}_{f2}(v_{LD}+v_{RF}+2v_r)-\dot{\Phi}_f(v_{LD}+v_{RF})$, and frequency of the fourth phase-delayed microwave signal is $2v_s+\dot{\Phi}_f(v_{LD}+v_t)+\dot{\Phi}_{f2}(v_{LD}+v_t+2v_s)-\dot{\Phi}_{f1}(v_{LD}+v_t)$.

The divide-by-two frequency is performed on the two microwave signals after being mixed to obtain the second frequency shift driving signal to obtain the second frequency shift driving signal, frequency $\Delta v_d$ of the second frequency shift driving signal is expressed as follows:

$$\Delta v_d = v_r - v_s + \frac{1}{2}\big[\dot{\Phi}_f(v_{LD}+v_{RF}) + \dot{\Phi}_{f2}(v_{LD}+v_{RF}+2v_r) - \dot{\Phi}_{f1}(v_{LD}+v_{RF}) - \dot{\Phi}_f(v_{LD}+v_t) - \dot{\Phi}_{f2}(v_{LD}+v_t+2v_s) + \dot{\Phi}_{f1}(v_{LD}+v_t)\big].$$

The second forward transmitting composite optical signal is separated by the second optical router to obtain the first downloading LO optical signal and the first downloading frequency shift optical signal, the fourth optical frequency shifter performs the frequency shifting on the first downloading LO optical signal according to the second frequency shift driving signal to obtain the third downloading LO optical signal, frequency of the third downloading LO optical signal is $v_{LD}+v_{RF}+\dot{\Phi}_{f1}(v_{LD}+v_{RF})+\Delta v_d$.

The third downloading LO optical signal and the first downloading frequency shift optical signal are combined into the fifth path, the third photodetector performs the frequency beating on the fifth path to generate the second output LO signal, frequency $v_2$ of the second output LO signal is expressed as follows:

$$v_2 = v_{RF} - v_t + \Delta v_d + \dot{\Phi}_{f1}(v_{LD}+v_{RF}) - \dot{\Phi}_{f1}(v_{LD}+v_t).$$

Expressions of $v_t$ and $\Delta v_d$ are substituted into the above expression to obtain an expression as follows:

$$v_2 = v_{RF} + \frac{1}{2}\dot{\Phi}_f(v_{LD}+v_{RF}+2v_r) - \frac{1}{2}\dot{\Phi}_f(v_{LD}+v_t+2v_s) - \frac{1}{2}\dot{\Phi}_{f2}(v_{LD}+v_{RF}+2v_r) - \frac{1}{2}\dot{\Phi}_{f1}(v_{LD}+v_{RF}) + \frac{1}{2}\dot{\Phi}_{f2}(v_{LD}+v_t+2v_s) + \frac{1}{2}\dot{\Phi}_{f1}(v_{LD}+v_t) = v_{RF} + \frac{1}{2}\dot{\Phi}_{f1}(v_{LD}+v_{RF}+2v_r) - \frac{1}{2}\dot{\Phi}_{f1}(v_{LD}+v_t+2v_s) - \frac{1}{2}\dot{\Phi}_{f1}(v_{LD}+v_{RF}) + \frac{1}{2}\dot{\Phi}_{f1}(v_{LD}+v_t).$$

Specifically, the $\dot{\Phi}_{f1}(v_{LD}+v_{RF}+2v_r)$ represents a ninth frequency shifting amount caused in the first optical fiber link by transmitting the first remote LO optical signal from the corresponding one of the plurality of the downloading user units to the central station unit, and the $\dot{\Phi}_{f1}(v_{LD}+v_t+2v_s)$ represents a tenth frequency shifting amount caused in the first optical fiber link by transmitting the first remote frequency shift optical signal from the corresponding one of the plurality of the downloading user units to the central station unit.

Since the first optical fiber link in the embodiments is the single-fiber link, it can be approximately considered as follows:

$$\dot{\Phi}_{f1}(v_{LD}+v_{RF}+2v_r) = \dot{\Phi}_{f1}(v_{LD}+v_{RF}); \text{ and}$$

$$\dot{\Phi}_{f1}(v_{LD}+v_t+2v_s) = \dot{\Phi}_{f1}(v_{LD}+v_t).$$

Therefore, the frequency $v_2$ of the second output LO signal is equal to $v_{RF}$ can be obtained. In this way, the stable reception of the LO signal is achieved at the plurality of the downloading user unit.

In the embodiments, the central station unit generates the central station frequency shift optical signal according to the phase/frequency fluctuation information of the first part of the first optical fiber link, and the remote user unit and the plurality of downloading user units eliminate influence of phase/frequency fluctuation information of the first optical fiber link through the central station frequency shift optical signal, in this way, stable reception of microwave LO signals at the remote user unit and the plurality of the downloading user units is achieved the central station frequency shift optical signal and is independent of LO signal frequency, thereby achieving distributed broadband microwave LO signal transmission.

The above embodiments only describe preferred embodiments of the present disclosure, and the description thereof is relatively specific and detailed, but cannot be understood as a limitation to a patent scope of the present disclosure. It should be noted that, for those who skilled in the art, several modifications and improvements may be made without departing from a concept of the present disclosure, which all fall within a protection scope of the present disclosure. Therefore, the protection scope of the present disclosure shall be subject to appended claims.

What is claimed is:

1. A high-precision distributed broadband microwave photonic local oscillator (LO) signal transmission system based on frequency tuning, comprising:

a central station unit;

a remote user unit; and a plurality of downloading user units;

wherein the plurality of the downloading user units are connected in series through a first optical fiber link to form a single-fiber bidirectional serial optical link, the first optical fiber link is a single-fiber link; a first end of the single-fiber bidirectional serial optical link is connected to the central station unit, a second end of the single-fiber bidirectional serial optical link is connected to the remote user unit;

the central station unit is configured to convert an LO signal to be transmitted to an optical domain through an optical carrier to form a central station LO optical signal, extract phase/frequency fluctuation information of a first part of the first optical fiber link between the central station unit and the remote user unit according to a remote loopback composite optical signal looped back by the remote user unit, generate a central station frequency shift optical signal according to the phase/frequency fluctuation information of the first part of the first optical fiber link, combine the central station LO optical signal and the central station frequency shift optical signal into a first path to form an output composite optical signal, and output the output composite optical signal to the first optical fiber link;

the remote user unit is configured to receive the output composite optical signal through the single-fiber bidirectional serial optical link, restore the output composite optical signal to obtain a first output LO signal, perform frequency shifting on each of optical signals in the output composite optical signal, combine the optical signals in the output composite optical signal into a second path to form the remote loopback composite optical signal, and loop back the remote loopback composite optical signal to central station unit; and the plurality of the downloading user units are configured to couple the output composite optical signal and the remote loopback composite optical signal and restore the output composite optical signal and the remote loopback composite optical signal after being coupled to obtain a second output LO signal, wherein the output composite optical signal is transmitted forward in the first optical fiber link and the remote loopback composite optical signal is transmitted backward in the first optical fiber link.

2. The high-precision distributed broadband microwave photonic LO signal transmission system based on frequency tuning according to claim 1, wherein frequency of the central station LO optical signal is $v_{LD}+v_{RF}$, and frequency of the central station frequency shift optical signal is $v_{LD}+v_t$;

$$v_t = \frac{1}{2}\big[2v_r - 2v_s + \dot{\Phi}_f(v_{LD} + v_{RF}) + \dot{\Phi}_f(v_{LD} + v_{RF} + 2v_r) - \dot{\Phi}_f(v_{LD} + v_t) - \dot{\Phi}_f(v_{LD} + v_t + 2v_s)\big];$$

wherein the $v_{LD}$ represents frequency of the optical carrier, the $v_{RF}$ represents frequency of the LO signal to be transmitted, the $2v_r$ represents first frequency shift generated by performing the frequency shifting on the central station LO optical signal by the remote user unit, the $2v_s$ represents second frequency shift generated by performing the frequency shifting on the central station frequency shift optical signal by the remote user unit, the $\dot{\Phi}_f(v_{LD}+v_{RF})$ represents a first frequency shifting amount caused in the first optical fiber link by transmitting the central station LO optical signal from the central station unit to the remote user unit, the $\dot{\Phi}_f(v_{LD}+v_t)$ represents a second frequency shifting amount caused in the first optical fiber link by transmitting the central station frequency shift optical signal from the central station unit to the remote user unit, the $\dot{\Phi}_f(v_{LD}+v_{RF}+2v_r)$ represents a third frequency shifting amount caused in the first optical fiber link by looping back a first remote LO optical signal from the remote user unit to the central station unit, and the $\dot{\Phi}_f(v_{LD}+v_t+2v_s)$ represents a fourth frequency shifting amount caused in the first optical fiber link by looping back a first remote frequency shift optical signal from the remote user unit to the central station unit; and frequency of the first output LO signal restored by the remote user unit is expressed as follows:

$$v_{RF} + v_r + \dot{\Phi}_f(v_{LD} + v_{RF}) - v_t - v_s - \dot{\Phi}_f(v_{LD} + v_t) = v_{RF}.$$

3. The high-precision distributed broadband microwave photonic LO signal transmission system based on frequency tuning according to claim 2, wherein the central station unit comprises a light source, a first optical splitter, and an electro-optical frequency converter, a first optical frequency shifter, a first optical combiner, an optical isolator, a Michelson interferometer, and a first frequency shift adjustment unit;

the light source is configured to output the optical carrier;

the first optical splitter is configured to divide the optical carrier into a first optical carrier and a second optical carrier, the first optical carrier is output to the electro-optical frequency converter, and the second optical carrier is output to the first optical frequency shifter;

the electro-optical frequency converter is configured to convert the LO signal to be transmitted into the optical domain through the first optical carrier output by the first optical splitter to obtain the central station LO optical signal;

the first optical frequency shifter is configured to perform the frequency shifting on the second optical carrier output by the first optical splitter according to a first frequency shift driving signal output by the first frequency shift adjustment unit to obtain the central station frequency shift optical signal;

the first optical combiner is configured to combine the central station LO optical signal and the central station frequency shift optical signal into the first path to obtain a central station composite optical signal;

the optical isolator is configured to unidirectionally transmit the central station composite optical signal output by the first optical combiner to the Michelson interferometer;

the Michelson interferometer is configured to couple the central station composite optical signal into a first central station composite optical signal and a second central station composite optical signal, the first central station composite optical signal is output to the first optical fiber link as the output composite optical signal to form a Michelson interferometer first arm, the second central station composite optical signal serves as a local composite optical signal, the local composite optical signal serves as a reference to form a Michelson interferometer second arm, the local composite optical signal is output to the first frequency shift adjustment unit along with the remote loopback composite optical signal looped back from the first optical fiber link; and the first frequency shift adjustment unit is configured to extract the phase/frequency fluctuation information of the first part of the first optical fiber link between the central station unit and the remote user unit through the local composite optical signal and the remote loopback composite optical signal output by the Michelson interferometer to obtain the first frequency shift driving signal and output the first frequency shift driving signal.

4. The high-precision distributed broadband microwave photonic LO signal transmission system based on frequency tuning according to claim 3, wherein the Michelson interferometer comprises a first optical coupler, a first Faraday reflector, and a second optical fiber link, the second optical fiber link is connected to the first optical coupler;

a first end of the first optical coupler serves as a first end of the Michelson interferometer and is connected to an output port of the optical isolator, a second end of the first optical coupler serves as a second end of the Michelson interferometer and is connected to an input port of the first frequency shift adjustment unit, a third end of the first optical coupler serves as a third end of the Michelson interferometer and is connected to the single-fiber bidirectional serial optical link, and a fourth end of the first optical coupler serves as a fourth end of the Michelson interferometer and is connected to the first Faraday reflector.

5. The high-precision distributed broadband microwave photonic LO signal transmission system based on frequency tuning according to claim 3, wherein the first frequency shift adjustment unit comprises a first photodetector, a first electronic filter, a second electronic filter, a first electronic mixer, a third electronic filter, and a phase-locked frequency source;

an input port of the first photodetetor serves as an input port of the first frequency shift adjustment unit and is connected to the Michelson interferometer, an output port of the first photodetector is respectively electrically connected to an input port of the first electronic filter and an input port of the second electronic filter;

an output port of the first electronic filter and an output port of the second electronic filter are respectively electrically connected to two input ports of the first electronic mixer;

an output port of the first electronic mixer is electrically connected to the phase-locked frequency source through the third electronic filter;

an output port of the phase-locked frequency source serves as an output port of the first frequency shift adjustment unit and is electrically connected to an electrical signal input port of the first optical frequency shifter;

the first photodetector is configured to perform frequency beating on the central station LO optical signal in the local composite optical signal and a loopback LO optical signal in the remote loopback composite optical signal to generate a first phase-delayed microwave signal, perform the frequency beating on the central station frequency shift optical signal in the local composite optical signal and the loopback frequency shift optical signal in the remote loopback composite optical signal to generate a second phase-delayed microwave signal;

the first electronic mixer is configured to mix the first phase-delayed microwave signal and the second phase-delayed microwave signal to generate a phase-locked reference signal; and the phase-locked frequency source is configured to generate the first frequency shift driving signal corresponding to frequency of the phase-locked reference signal.

6. The high-precision distributed broadband microwave photonic LO signal transmission system based on frequency tuning according to claim 1, wherein the remote user unit comprises a first optical router, a first frequency source, a second optical frequency shifter, a second frequency source, a third optical frequency shifter, a bidirectional optical coupling reflector, and a second photodetector;

the first optical router is configured to receive the output composite optical signal from the first optical fiber link and extract the central station LO optical signal as a second remote LO optical signal to a first optical end of the second optical frequency shifter, extract the central station frequency shift optical signal as a second remote frequency shift optical signal to a first optical end of the third optical frequency shifter, and combine the first remote LO optical signal looped back from the second optical frequency shifter and the first remote frequency shift optical signal looped backed from the third optical frequency shifter into the second path to form the remote loopback composite optical signal, and output the remote loopback composite optical signal to the first optical fiber link;

the first frequency source is configured to generate a first frequency signal;

the second optical frequency shifter is configured to perform the frequency shifting on the second remote LO optical signal according to the first frequency signal to obtain a third remote LO optical signal, output the third remote LO optical signal from a second optical end thereof to a first end of the bidirectional optical coupling reflector, perform the frequency shifting on the third remote LO optical signal looped back from the second optical end thereof to obtain the first remote LO optical signal, and output the first remote LO optical signal from the first optical end thereof to the first optical router;

the second frequency source is configured to generate a second frequency signal;

the third optical frequency shifter is configured to perform the frequency shifting on the second remote frequency shift optical signal according to the second frequency signal to obtain a third remote frequency shift optical signal, output the third remote frequency shift optical signal from a second optical end thereof to a second end of the bidirectional optical coupling reflector, perform the frequency shifting on the third remote frequency shift optical signal looped back from the second optical end thereof to obtain the first remote frequency shift optical signal, and output the first remote frequency shift optical signal to the first optical router;

the bidirectional optical coupling reflector is configured to couple the third remote LO optical signal from the first end thereof and reflect the third remote LO optical signal back to the second optical frequency shifter, couple the third remote frequency shift optical signal from the second end thereof and reflect the third remote frequency shift optical signal back to the third optical frequency shifter, combine the third remote LO optical signal and the third remote frequency shift optical signal into a third path to form a remote composite optical signal, and output the remote composite optical signal to the second photodetector through a third end thereof; and the second photodetector is configured to perform the frequency beating on the third remote LO optical signal and the third remote frequency shift optical signal in the remote composite optical signal and generate the first output LO signal.

7. The high-precision distributed broadband microwave photonic LO signal transmission system based on frequency tuning according to claim 6, wherein the bidirectional optical coupling reflector comprises a second optical coupler and a second Faraday reflector, a first end of the second optical coupler serves as a first end of the bidirectional optical coupling reflector and is connected to a second optical end of the second optical frequency shifter, a second end of the second optical coupler serves as a second end of the bidirectional optical coupling reflector and is connected to a second optical end of the third optical frequency shifter, a third end of the second optical coupler serves as a third end of the bidirectional optical coupling reflector and is connected to the second photodetector, and a fourth end of the second optical coupler serves as a fourth end of the bidirectional optical coupling reflector and is connected to the second Faraday reflector.

8. The high-precision distributed broadband microwave photonic LO signal transmission system based on frequency tuning according to claim 1, wherein the second output LO signal restored by the plurality of the downloading user units is expressed as follows:

$$v_{RF} - v_t + \Delta v_d + \dot{\Phi}_{f1}(v_{LD} + v_{RF}) - \dot{\Phi}_{f1}(v_{LD} + v_t) = v_{RF},$$

$$\text{wherein, } \Delta v_d = v_r - v_s + \frac{1}{2}\Big[\dot{\Phi}_f(v_{LD} + v_{RF}) + \dot{\Phi}_{f2}(v_{LD} + V_{RF} + 2v_r) - \dot{\Phi}_{f1}(v_{LD} + v_{RF}) - \dot{\Phi}_f(v_{LD} + v_t) - \dot{\Phi}_{f2}(v_{LD} + v_t + 2v_s) + \dot{\Phi}_{f1}(v_{LD} + v_t)\Big];$$

wherein the $\dot{\Phi}_f(v_{LD}+v_{RF})$ represents a fifth frequency shifting amount caused in the first optical fiber link by transmitting the central station LO optical signal from the central station unit to a corresponding one of the plurality of the downloading user units, the $\dot{\Phi}_f(v_{LD}+v_t)$ represents a sixth frequency shifting amount caused in the first optical fiber link by transmitting the central station frequency shift optical signal from the central station unit to the corresponding one of the plurality of the downloading user units, the $\dot{\Phi}_{f2}(v_{LD}+v_{RF}+2v_r)$ represents a seventh frequency shifting amount caused in the first optical fiber link by transmitting a first remote LO optical signal from the remote user unit to the corresponding one of the plurality of the downloading user units, and the $\dot{\Phi}_{f2}(v_{LD}+v_t+2v_s)$ represents an eighth frequency shifting amount caused in the first optical fiber link by transmitting a first remote frequency shift optical signal from the remote user unit to the corresponding one of the plurality of the downloading user units.

9. The high-precision distributed broadband microwave photonic LO signal transmission system based on frequency tuning according to claim 8, wherein each of the plurality of the downloading user units comprises a third optical coupler, a second optical splitter, a second optical combiner, a second frequency shift adjustment unit, a second optical router, a fourth optical frequency shifter, a third optical combiner, and a third photodetector;

the third optical coupler is configured to couple the output composite signal from the first optical fiber link as a forward transmitting composite optical signal, couple the remote loopback composite optical signal from the first optical fiber link as a backward transmitting optical signal, serve the central station LO optical signal in the output composite optical signal after being coupled as a first downloading LO optical signal of the forward transmitting composite optical signal, serve the central station frequency shift optical signal in the output composite optical signal after being coupled as a first downloading frequency shift optical signal of the forward transmitting composite optical signal, serve the first remote LO optical signal in the remote loopback composite optical signal after being coupled as a second downloading LO optical signal of the backward transmitting composite optical signal, serve the first remote frequency shift optical signal in the remote loopback composite optical signal after being coupled as a second downloading frequency shift optical signal of the backward transmitting composite optical signal, transmit the forward transmitting composite optical signal to the second optical splitter through a first end of the third optical coupler, and transmit the backward transmitting composite optical signal to the second optical combiner through a second end of the third optical coupler;

the second optical splitter is configured to divide the forward transmitting composite optical signal output by the third optical coupler into a first forward transmitting composite optical signal and a second forward transmitting composite optical signal, the first forward transmitting composite optical signal is output to the second optical combiner, and the second forward transmitting composite optical signal is output to the second optical router;

the second optical combiner is configured to combine the backward transmitting composite optical signal output by the third optical coupler and the first forward transmitting composite optical signal output by the second optical splitter into a fourth path to form a first downloading composite optical signal;

the second frequency shift adjustment unit is configured to extract phase/frequency fluctuation information of a second part of the first optical fiber link between the central station unit and the corresponding one of the plurality of the downloading user units and a third part of the first optical fiber link from the central station unit through the remote user unit back to the corresponding one of the plurality of the downloading user units to obtain a second frequency shift driving signal, and output the second frequency shift driving signal;

the second optical router is configured to extract the first downloading LO optical signal from the second forward transmitting composite optical signal output by the second optical splitter, output the first downloading LO optical signal to the fourth optical frequency shifter, extract the first downloading frequency shift optical signal from the forward transmitting composite optical signal output by the second optical splitter, and output the first downloading frequency shift optical signal to the third optical combiner;

the fourth optical frequency shifter is configured to perform the frequency shifting on the first downloading LO optical signal output by the second optical router according to the second frequency shift driving signal output by the second frequency shift adjustment unit to obtain a third downloading LO optical signal;

the third optical combiner is configured to combine the third downloading LO optical signal output by the fourth optical frequency shifter and the first downloading frequency shift optical signal output by the second optical router into a fifth path to form a second downloading composite optical signal; and the third photodetector is configured to perform the frequency beating on the third downloading LO optical signal and the first downloading frequency shift optical signal in the second downloading composite optical signal to generate the second output LO signal.

10. The high-precision distributed broadband microwave photonic LO signal transmission system based on frequency tuning according to claim 9, wherein the second frequency shift adjustment unit comprises a fourth photodetector, a fourth electronic filter, a fifth electronic filter, a second electronic mixer, and a binary frequency divider;

an input port of the fourth photodetector serves as an input port of the second frequency shift adjustment unit and is connected to an output port of the second optical combiner, an output port of the fourth photodetector is respectively electrically connected to an input port of the fourth electronic filter and an input port of the fifth electronic filter;

an output port of the fourth electronic filter and an output port of the fifth electronic filter are respectively electrically connected to two input ports of the second electronic mixer;

an output port of the second electronic mixer is electrically connected to an input port of the binary frequency divider;

an output port of the binary frequency divider serves as an output port of the second frequency shift adjustment unit and is electrically connected to an electrical signal input port of the fourth optical frequency shifter;

the fourth photodetector is configured perform the frequency beating on the first downloading LO optical signal in the forward transmitting composite optical signal and the second downloading LO optical signal in the backward transmitting composite optical signal to generate a third phase-delayed microwave signal, and perform the frequency beating on the first downloading frequency shift optical signal in the forward transmitting composite optical signal and the second downloading frequency shift optical signal in the backward transmitting composite optical signal to generate a fourth phase-delayed microwave signal;

the second electronic mixer is configured to mix the third phase-delayed microwave signal and the fourth phase-delayed microwave signal to generate a frequency shift reference signal;

the binary frequency divider is configured to divide the frequency shift reference signal by a divide-by-two frequency to obtain the second frequency shift driving signal.

* * * * *